(12) United States Patent
Xiang et al.

(10) Patent No.: US 11,093,504 B2
(45) Date of Patent: *Aug. 17, 2021

(54) SERVER-SIDE CROSS-MODEL MEASURE-BASED FILTERING

(71) Applicant: BUSINESS OBJECTS SOFTWARE LTD., Dublin (IE)

(72) Inventors: Ping Xiang, Richmond (CA); Semuel Kadarusman, Burnaby (CA); Patrick Wang, Richmond (CA); Justin Wong, Burnaby (CA); Veljko Jovanovic, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 156 days.

This patent is subject to a terminal disclaimer.

(21) Appl. No.: 16/700,434

(22) Filed: Dec. 2, 2019

(65) Prior Publication Data
US 2021/0165828 A1 Jun. 3, 2021

(51) Int. Cl.
*G06F 15/16* (2006.01)
*G06F 16/2455* (2019.01)

(52) U.S. Cl.
CPC .................. *G06F 16/2456* (2019.01)

(58) Field of Classification Search
None
See application file for complete search history.

(56) References Cited

U.S. PATENT DOCUMENTS

| 2008/0235231 | A1* | 9/2008 | Gass .................. G06F 21/6227 |
| 2013/0238549 | A1 | 9/2013 | Aski et al. |
| 2014/0181151 | A1 | 6/2014 | Mazoue |
| 2016/0378833 | A1* | 12/2016 | Chainani ............. G06F 16/2456 707/741 |
| 2017/0116260 | A1* | 4/2017 | Chattopadhyay ..... G06F 16/243 |
| 2018/0336710 | A1* | 11/2018 | Zhao ..................... G06F 16/283 |

FOREIGN PATENT DOCUMENTS

EP 3188042 A1 7/2017

OTHER PUBLICATIONS

Communication: "Extended European Search Report", dated Apr. 26, 2021 (dated Apr. 26, 2021), European Patent Office, for European Application No. 20210193.7-1231, 8pgs.

* cited by examiner

*Primary Examiner* — Alex Gofman
(74) *Attorney, Agent, or Firm* — Buckley, Maschoff & Talwalkar LLC (57) ABSTRACT

Some embodiments provide execution of a query on a target data model which is filtered on a measure of a source data model, even if the source data model and the target data model are not logically linked. Some embodiments further support execution of a query on a target data model which is filtered on a measure of a source data model and on a dimension filter of another data model. Some embodiments provide for a substantial amount of query execution to occur on the backend, thereby freeing client resources in comparison to prior approaches.

19 Claims, 9 Drawing Sheets

| Region | CD1_Region | Product | Quantity |
|---|---|---|---|
| region_A | region_A | XY | 3 |
| region_A | region_A | YZ | 10 |
| region_B | region_B | XY | 2 |
| region_B | region_B | YZ | 10 |
| region_C | region_C | XY | 7 |

| Region | CD1_Region | Product | Quantity |
|---|---|---|---|
| region_A | region_A | YZ | 10 |
| region_B | region_B | YZ | 10 |

| Region | Company_ID | Revenue |
|---|---|---|
| region_A | C1 | 7000 |
| region_A | C2 | 20000 |
| region_B | C3 | 11000 |
| region_B | C4 | 5000 |

| Region | Company_ID | Revenue |
|---|---|---|
| region_A | C1 | 7000 |
| region_A | C2 | 20000 |

| Region | CD2_Region | Company_ID | Revenue |
|---|---|---|---|
| region_A | region_A | C1 | 7000 |
| region_A | region_A | C2 | 20000 |

| CD1_Region |
|---|
| region_A |
| region_B |

⋈

*800*

| CD2_Region |
|---|
| region_A |
| region_A |

⋈

*220*

| Region | Population |
|---|---|
| region_A | 2 |
| region_B | 5 |
| region_C | 1 |
| region_D | 3 |

| Region | Population |
|---|---|
| region_A | 2 |

SERVER-SIDE CROSS-MODEL MEASURE-BASED FILTERING

BACKGROUND

Modern computing systems receive, generate, and store data related to many aspects of an enterprise. Users operate reporting tools to access such data and display the data in useful formats, such as in graphic visualizations. Specifically, a reporting tool may submit a query to a data storage system and present a visualization of a corresponding result set.

The query may specify, dimensions, measures and/or filters of a data model, or schema. A data model characterizes the stored data in a manner which is intended to be suitable for an expected purpose of the data model. Multiple independent data models may be constructed for different expected purposes. In some instances, a user may wish to query a second data model under a constraint on a dimension of a first data model.

If the first and second data models are not logically linked, execution of such a query requires specification of an association between at least one dimension of each of the data models. Execution further requires fetching of tuples of the associated dimension(s) of the first data model which satisfy a specified filter on the first data model, and then querying the second data model based on each fetched tuple.

The above execution becomes exponentially more difficult in the case of a measure-based filter. Like other filters such as dimension filters, the application of a measure-based filter is affected by the existence of higher-level (e.g., story, page) filters. However, the application of a measure-based filter is also affected by any dimension filters which exist on a same level.

Conventional cross-model filtering may therefore consume substantial client processing resources and network bandwidth. Systems are desired to efficiently support measure-based filtering across data models.

BRIEF DESCRIPTION OF THE DRAWINGS

FIG. 9 is a tabular representation of a filtered intermediate table including a calculated dimension according to some embodiments.

FIG. 10 illustrates a join between the calculated dimensions of FIGS. 6 and 10 and a target fact table.

FIG. 11 is a tabular representation of a result table according to some embodiments.

DETAILED DESCRIPTION

The following description is provided to enable any person in the art to make and use the described embodiments. Various modifications, however, will remain readily apparent to those in the art.

Generally, some embodiments provide execution of a query on a target data model which is filtered on a measure of a source data model, even if the source data model and the target data model are not logically linked. Some embodiments further support execution of a query on a target data model which is filtered on a measure of a source data model and on a dimension filter of another data model. Some embodiments provide for a substantial amount of query execution to occur on the backend, thereby freeing client resources in comparison to prior approaches.

Figure 1:
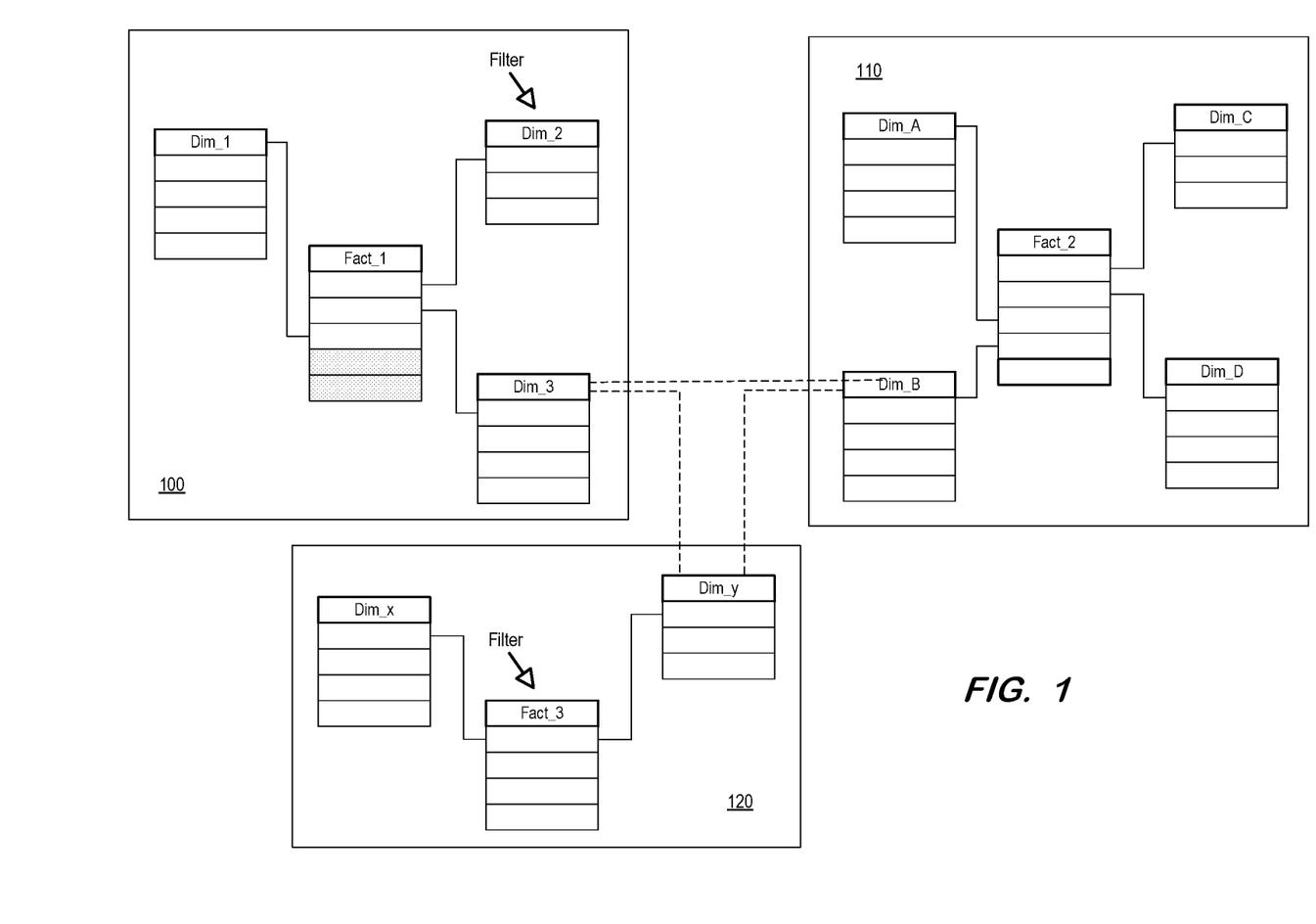
FIG. 1 is a view of three data models and logical links between dimensions of the data models according to some embodiments.

According to some embodiments, an association is established between dimensions of the data models which will participate in cross-model filtering. FIG. 1 illustrates an example of the foregoing scenario according to some embodiments.

FIG. 1 includes data model 100 consisting of fact table Fact_1 and dimension tables Dim_1, Dim_2, and Dim_3. Fact table Fact_1 includes foreign keys to each of dimension tables Dim_1, Dim_2, and Dim_3 and two measures (shaded). Dimensions are logical entities along which an analysis or report may be executed (e.g., Year, Country, Product), and measures (e.g., Sales, Profit) are values which can be determined for a given combination of dimension values, or dimension members (e.g., Sales for 2006, U.S.A., Televisions).

Data model 110 includes fact table Fact_2 and dimension tables Dim_A, Dim_B, Dim_C, and Dim_D, and data model 120 includes fact table Fact 3 and dimension tables Dim_x and Dim_y. Although fact tables Fact_1, Fact_2 and Fact_3 are associated with three, four and two dimensions, respectively, embodiments may support models including any number of dimensions. Embodiments may also support data models conforming to schema topologies different from the star schemas depicted in FIG. 1.

The schemas of data models 100, 110 and 120 do not define any logical relationships between data models 100, 110 and 120. FIG. 1 includes dashed lines to depict links between dimension Dim_3 of data model 100 and dimension Dim_B of data model 110, between dimension Dim_3 of data model 100 and dimension Dim_y of data model 120, and between dimension Dim_B of data model 110 and dimension Dim_y of data model 120. As will be described below, the links may be user-specified in order to support a query on a measure of fact table Fact_2 of data model 110 which is filtered on a non-linked dimension (e.g., dimension Dim_2) of data model 100 and on a measure of fact table Fact 3 of data model 120.

Figure 2:
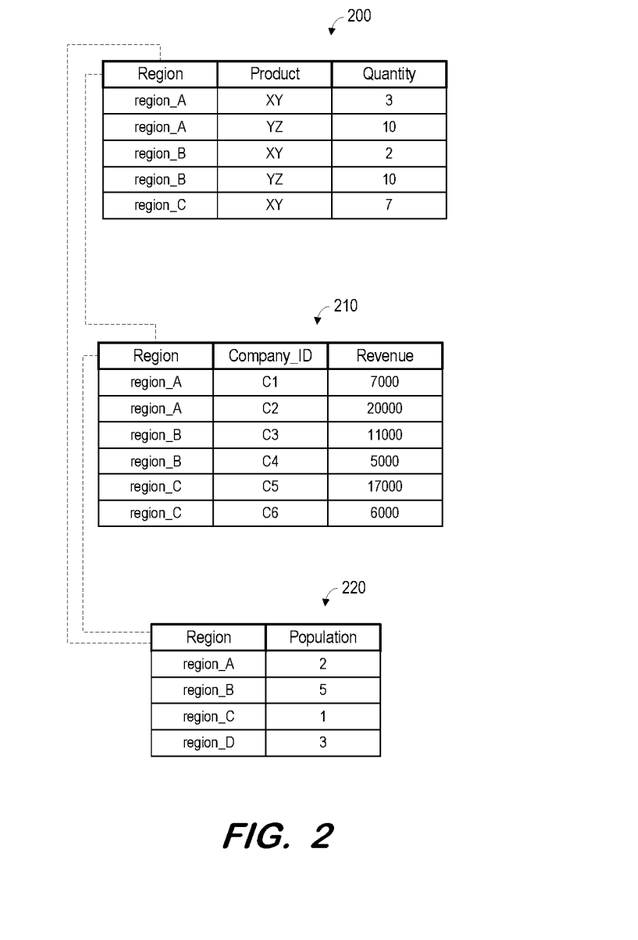
FIG. 2 shows tabular representations of a first table conforming to a first data model, a second table conforming to a second data model, a third table conforming to a third data model, and logical links therebetween according to some embodiments

FIG. 2 shows tabular representations of tables 200, 210 and 220 conforming to separate data models such as data models 100, 110 and 120. It will be assumed that the schemas of each data model do not define a logical relationship therebetween. Nevertheless, as illustrated by dashed lines, links or associations have been determined (e.g., via user input) between the Region dimension of each data model. Although the linked dimensions are similarly-named, embodiments are not limited thereto. The tables of FIG. 2 will be used below to provide an example of execution of a query on a target data model which is filtered on a measure of another data model.

Figure 3:
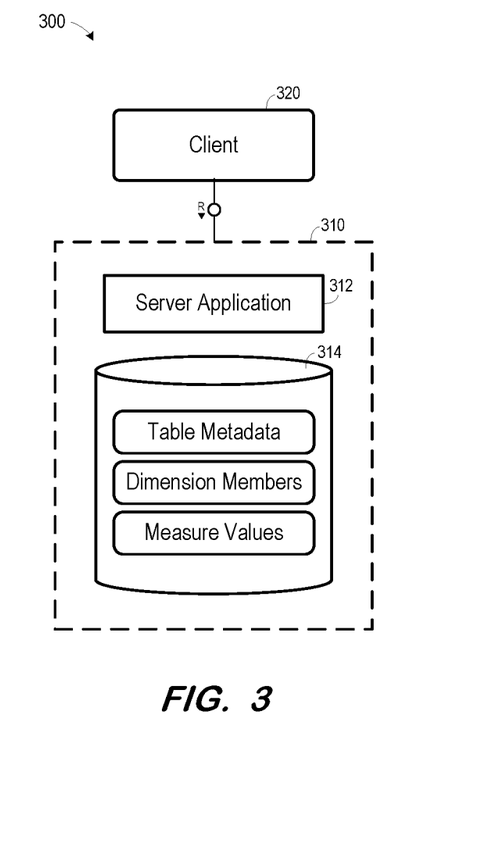
FIG. 3 is a block diagram of a system architecture according to some embodiments.

FIG. 3 is a block diagram of system architecture 300 according to some embodiments. Embodiments are not limited to system architecture 300 or to a database architecture.

Architecture 300 includes data server 310 and client 320. Generally, data server 310 receives requests from client 320 and provides results to client 320 based on those requests. Server application 312 may be separated from or closely integrated with data store 314. Server application 312 may be executed completely on the database platform of data store 314, without the need for an additional server. Architecture 300 may be implemented using any client-server architecture that is or becomes known, including but not limited to on-premise, cloud-based and hybrid architectures.

In one specific example, client 320 executes an application to present a user interface to a user. The user defines a query using the user interface, and client 320 forwards a request based on the query to server 310. Server application 312 generates an SQL script based on the request and forwards the SQL script to data store 314. Data store 314 executes the SQL script to return a result set based on data of data store 314, and client 320 generates and displays a report/visualization based on the result set.

Data store 314 stores table metadata, dimension members, and measure values. Generally, the table metadata defines two or more data models, each of which includes data objects such as dimension and measures. The stored dimension members and measure values comprise data representing actual (i.e., instantiated) versions of those objects. The table metadata also associates each measure and dimension with one or more physical entities (e.g., a physical database table, associated columns of one or more database tables).

The data of data store 314 may comprise one or more of conventional tabular data, row-based data, column-based data, and object-based data. Moreover, the data may be indexed and/or selectively replicated in an index to allow fast searching and retrieval thereof. Data store 314 may support multi-tenancy to separately support multiple unrelated clients by providing multiple logical database systems which are programmatically isolated from one another.

Data store 314 may comprise any query-responsive data source or sources that are or become known, including but not limited to a structured-query language (SQL) relational database management system. Data store 314 may comprise a relational database, a multi-dimensional database, an eXtendable Markup Language (XML) document, or any other data storage system storing structured and/or unstructured data. The data of data store 314 may be distributed among several relational databases, dimensional databases, and/or other data sources. Embodiments are not limited to any number or types of data sources.

Data store 314 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 320 may comprise one or more devices executing program code of an application for presenting user interfaces to allow interaction with server 310. The user interfaces may be suited for reporting, data analysis, and/or any other functions based on the data of data store 314.

Figure 4:
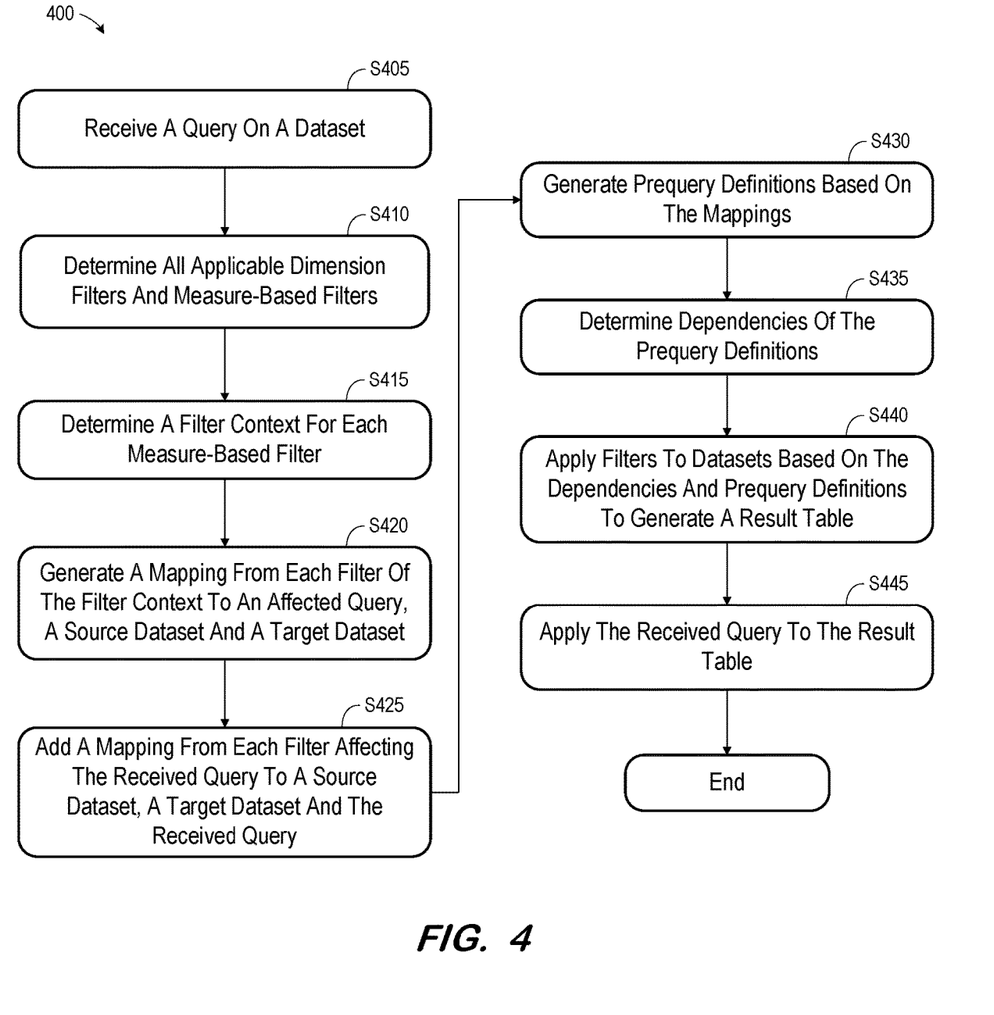
FIG. 4 is a flow diagram of a process to execute a query on a data model based on a measure-based filter on another data model according to some embodiments.

FIG. 4 comprises a flow diagram of process 400 according to some embodiments. Process 400 may be executed to execute a query on a data model which is filtered on a measure of another data model.

In some embodiments, various hardware elements of system 300 execute program code to perform process 400. Process 400 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S405, a query on a dataset is received. The query may specify one or more dimension and measure-based filters on the dataset as is known in the art. The query may be received via any user interface for constructing and submitting queries that is or becomes known.

According to some embodiments, the query may simply comprise a request to view the dataset, or to view a particular measure value of the dataset. The examples herein assume that the query is received within a context including one or more other applicable filters on one or more other datasets. Process 400 describes execution of the query received at S405 while taking the other filter(s) and dataset(s) into account.

Some embodiments support a hierarchy of filters. For example, a story filter may apply to every data visualization of a group of data visualizations within the story. More specifically, each data visualization of the group corresponds to a respective query consisting of measures, dimensions and/or filters, and is a visual representation of a result set retrieved based on the query. The result set of each data visualization is further filtered by any applicable story filters.

A group of data visualizations may be divided into subgroups (e.g., pages), each of which is associated with a respective set of filters. Therefore, a data visualization of a given page is filtered based on its own associated query, by any page-level filters associated with the given page, and by any story-level filters associated with the story to which the page belongs. Embodiments may employ any other types of hierarchies, including no hierarchies.

In terms of filter application, a measure-based filter of a given hierarchical level does not affect another measure-based filter on the same hierarchical level. Accordingly, either measure-based filter may be applied without consideration of the existence of the other measure-based filter. However, application of a measure-based filter of a given hierarchical level is affected by a dimension filter on the same hierarchical level. Moreover, a measure-based filter of a given hierarchical level is affected by dimension filters and measure-based filters of a higher hierarchical level. With reference to the story-page hierarchy described above, a story-level measure-based filter will affect a page-level measure-based filter, a page-level measure-based filter will not affect a page-level measure-based filter, and a page-level measure-based filter will not affect a story-level measure-based filter.

All applicable dimension filters and measure-based filters are determined at S410. These filters comprise the current context of the received query and should be taken into account during execution of the query. According to one example, in which DF=dimension filter and MBF=measure-based filter, the current filters for a story are DF-S1, MBF-S1, MBF-S2, and the current filters for a page of the story are DF-P1, MBF-P1, MBF-P2. Accordingly, based on the dependency rules noted above, the filter context of MBF-S1 is DF-S1 and the filter context MBF-S2 is DF-S1. Similarly, the filter context of MBF-P1 is DF-P1, DF-S1, MBF-S1, MBF-S2, and the filter context of MBF-P2 is DF-P1, DF-S1, MBF-S1, MBF-S2.

If, for example, filters DF-P1 and MBF-P1 are on a first page of the story and filter MBF-P2 is on a second page of the story, the filter contexts for MBF-P1 are DF-P1, DF-S1, MBF-S1, MBF-S2. The filter contexts for MBF-P2 are DF-S1, MBF-S1, MBF-S2, and because DF-P1 will not affect MBF-P2 because it is not on the same page as MBF-P2.

According to the present example, it will be assumed that the main query received at S405 is a query on table 220 of FIG. 2, and story filters are present on a dimension of table 200 (e.g., "Product=YZ") and on a measure of table 210 (e.g., "Sum of Revenue per Region is >21000"). Accordingly, the dimension filter on table 200 (i.e., DF-200) and the measure-based filter on table 210 (i.e., MBF-210) are determined at S410.

Next, at S415, a filter context is determined for each determined measure-based filter. The filter context includes filters from all datasets linked to the measure-based filter, even if some of these datasets might not be linked to the main query dataset. In the present example, and in view of the discussion above, the filter context for the measure-based filter on table 210 consists of the dimension filter on table 200.

A mapping is generated at S420 from each filter of the filter context to an affected query, a source dataset and a target dataset. Since the filter context of the present example includes only DF-200, the mapping generated at S420 according to the present example may be expressed as: [MBF-210 Query][200][210]: DF-200.

A mapping is added at S425 from each filter affecting the query to a source dataset, a target dataset, and the received query. For example, [Received Query][210][220]: MBF-210, and [Received Query] [200][220]: DF-200. Prequery definitions are generated based on the mappings at S430. Each prequery definition is marked to indicate whether it is related to the received query or to a measure-based filter. Since application of a measure-based filter requires a prequery, S430 includes creation of a prequery definition for each measure-based filter.

The prequery definitions may specify linked calculated dimensions to be generated in order to execute the received query. According to the source and target datasets of the above mappings, the prequery definitions generated at S430 may comprise: LCD 200-210, LCD 210-220, LCD 200-220 and MBF-210.

Figure 5:
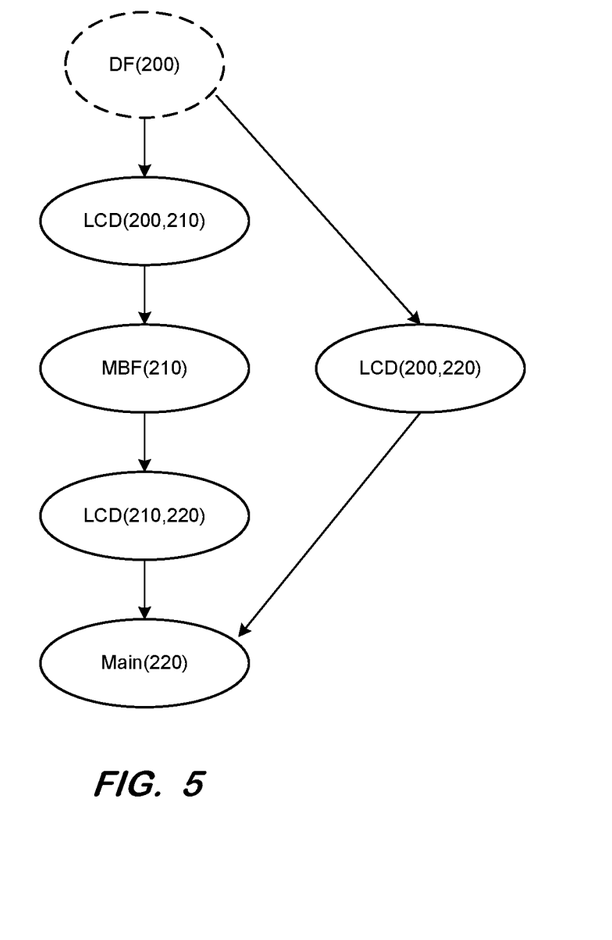
FIG. 5 is a filter dependency graph according to some embodiments.

The filter dependencies of the prequery definitions are determined at S435. FIG. 5 illustrates dependencies determined at S435 based on the mappings according to the present example. A prequery definition related to a measure-based filter is determined at S435 to be dependent on that measure-based filter. The determined dependencies will be used to fulfill the received query as described below.

Next, at S440, filters are applied to the various datasets based on the dependencies and on calculated dimensions corresponding to the prequery definitions. Application of the filters at S440 results in generation of a result table as will be described below.

With reference to the present example and the dependencies illustrated in FIG. 5, S440 may commence with the application of dimension filter DF-200 (i.e., "Product=YZ") to table 200. Since dimension filter DF-200 is to also be applied to MBF-210, application of dimension filter DF-200 may comprise generation of a filtered calculated dimension.

Figure 6A:
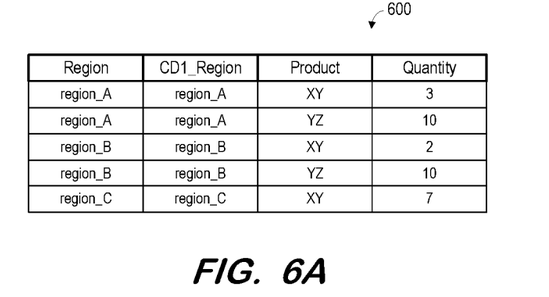
FIGS. 6A and 6B are tabular representations of unfiltered and filtered intermediate tables including a calculated dimension according to some embodiments.

FIG. 6A illustrates table 600 including calculated dimension CD1 Region. The calculated dimension is the dimension linking table 200 and 210. The rows of calculated dimension CD1 Region are identical to the rows of the Region dimension of table 200.

Figure 6B:
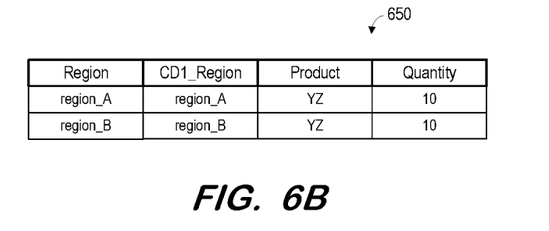

The calculated dimension is filtered on dimension filter DF-200 (i.e., "Product=YZ") to generate filtered rows of the calculated dimension as shown in table 650 of FIG. 6B. The filtered calculated dimension may be generated at server 310 in response to a pre-query transmitted from client 320, and stored at server 310 as an intermediate result.

Figure 7:
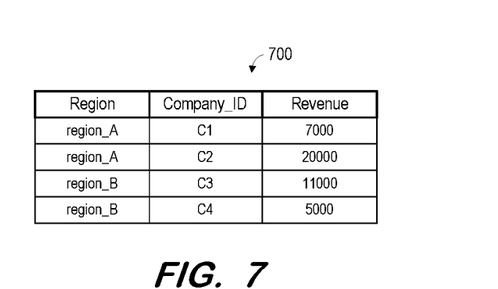
FIG. 7 is a tabular representation of a result of joining the FIG. 6B table with a fact table according to some embodiments.

An inner join is then executed on the filtered rows 650 of the calculated dimension and table 210 to generate a result table such as table 700 of FIG. 7. As is known in the art, the result of an inner join includes only those tuples that satisfy the matching criteria, and excludes other tuples. Accordingly, result set 700 includes only those tuples of table 210 which include a tuple of the calculated dimension 650 (i.e., [region_A] or [region_B]).

Figure 8:
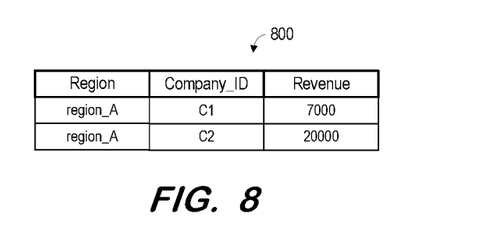
FIG. 8 is a tabular representation of a result of applying a measure-based filter to the FIG. 7 table according to some embodiments.

The measure-based filter MBF-210 ("Sum of Revenue per Region is >21000") is applied to result set 700, resulting in table 800 of FIG. 8. Again, the join and filtering may be performed at server 310 in response to a pre-query transmitted from client 320, with table 800 being stored at server 310 as an intermediate result.

Returning to FIG. 5, LCD(200, 220) is required to apply DF-200 to the main query, and LCD(210, 220) is required to apply MBF-210 to the main query. Since the dimension of table 200 linked to table 220 is again the Region dimension, the calculated and filtered dimension LCD(200, 220) is identical to previously-described table 650 of FIG. 6B. Similarly, the calculated and filtered dimension LCD(210, 220) is based on previously-described table 800 of FIG. 8. as shown in FIG. 9.

The two filtered calculated dimensions CD1 Region and CD2 Region are subjected to an inner join with target table 220 as illustrated in FIG. 10. Since only region_A is common to the linked dimensions, result table 1100 of FIG. 11 is filtered on region_A. After generation of the result table, the received query is applied thereto at S445.

Figure 12:
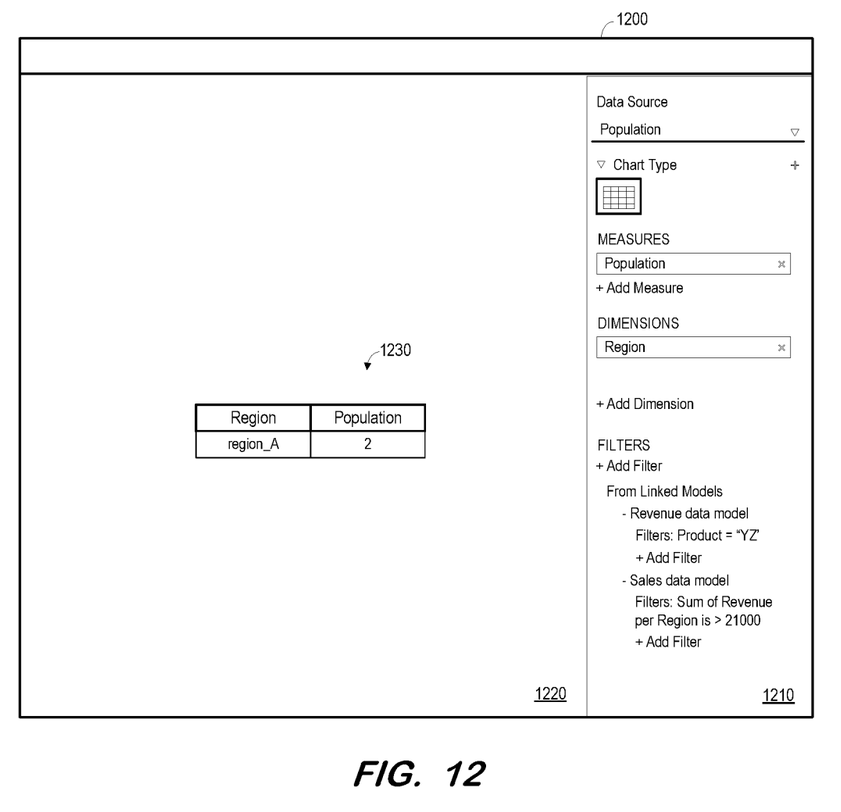
FIG. 12 is a view of a user interface to present data visualizations including a result table according to some embodiments.

FIG. 12 illustrates interface 1200 for presenting a result set according to some embodiments. Interface 1200 of FIG. 12 may comprise a Web page displayed by a Web browser application executing on a client device. Embodiments are not limited to interface 1200. The Web page may be provided by a cloud-based or on-premise Web server. Interface 1200 is not limited to Web-based formats. User interface 1200 may be rendered on server 310 or may be transmitted to client 320 as XML, HTML and JavaScript for rendering thereon.

Interface 1200 includes query definition area 1210 to receive elements of a query from a user. Area 1210 includes fields which allow a user to specify a data source (i.e., data model) to which the query will be applied, a chart type (e.g., pie, line, bar, etc.), one or more measures, zero or more dimensions, and zero or more filters.

As shown in interface 1200, the user has selected a Population data source, which in the present example is represented by table 220 of FIG. 2. Selection of the data source may be considered to represent the query received at S405 of the above example. In other words, the received query in the above example is a query for all rows of the Population data source.

Accordingly, process 400 executes in view of the current filter context which, in the above example, includes a dimension filter on a linked Revenue data model and a measure-based filter on a linked Sales data model. The resulting table 1230 is presented in area 1220. Table 1230 may be further filtered using the controls of area 1210.

Figure 13:
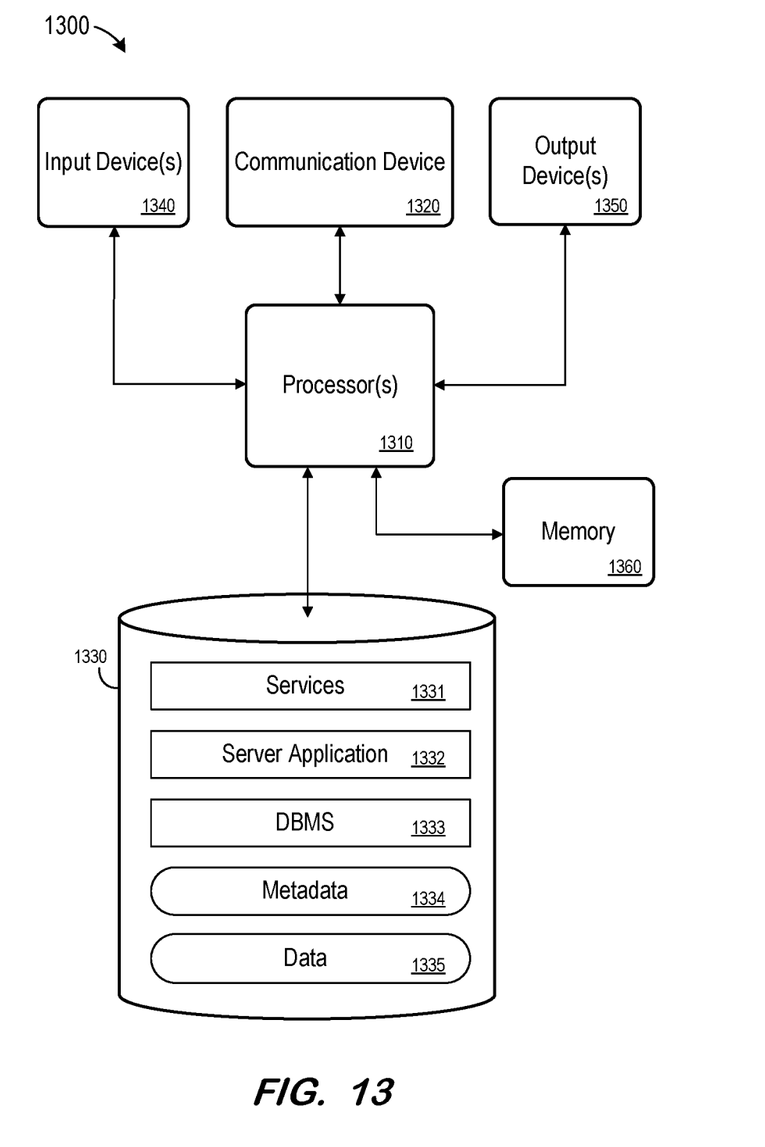
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of server 310 of FIG. 3 in some embodiments. Apparatus 1300 may include other unshown elements according to some embodiments.

Apparatus 1300 includes processor(s) 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen), a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Services 1331, server application 1332 and DBMS 1333 may comprise program code executed by processor 1310 to cause apparatus 1300 to perform any one or more of the processes described herein. Embodiments are not limited to execution of these processes by a single apparatus.

Metadata 1334 and data 1335 (either cached or a full database) may be stored in volatile memory such as memory 1360. Metadata 1334 may include information regarding dimensions and measures associated with the data models represented within data 1334. Data storage device 1330 may also store data and other program code for providing additional functionality and/or which are necessary for operation of apparatus 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a client system comprising a first memory storing processor-executable program code and a first processor to execute the program code to cause the client system to:
receive a query on a first data model, the first data model including a first dimension linked to a second dimension of a second data model;
determine a measure-based filter on the second data model; and
determine a filter context of the measure-based filter, the filter context comprising a dimension filter on a third data model, the third data model including a third dimension linked to the second dimension of the second data model;
a server system comprising a second memory storing processor-executable program code and a second processor to execute the program code to cause the server system to:
generate a first calculated dimension associated with the third dimension of the third data model;
apply the dimension filter to the first calculated dimension to generate filtered rows of the first calculated dimension;
execute an inner join between the filtered rows of the first calculated dimension and a fact table of the second data model to generate a first result table including one or more measure values of the second data model;
apply the measure-based filter to the first result table to generate filtered rows of the first result table;
generate a second calculated dimension associated with the filtered rows of the first result table;
apply the measure-based filter to the second calculated dimension to generate filtered rows of the second calculated dimension;
execute an inner join between the filtered rows of the first calculated dimension, the filtered rows of the second calculated dimension, and a fact table of the first data model to generate a second result table;
generate a visualization based on the second result table, wherein the user device is to display the visualization.

2. A system according to claim 1, the client system to transmit a pre-query to the server system to request generation of the first calculated dimension and application of the dimension filter to the first calculated dimension to generate the filtered rows of the first calculated dimension.

3. A system according to claim 2, the server system to store the filtered rows of the first calculated dimension as an intermediate table.

4. A system according to claim 3, the client system to transmit a second pre-query to the server system to request generation of the second calculated dimension and application of the measure-based filter to the second calculated dimension to generate the filtered rows of the second calculated dimension.

5. A system according to claim 4, the server system to store the filtered rows of the second calculated dimension as a second intermediate table.

6. A system according to claim 1, wherein generation of the visualization comprises execution of a query on the second result table.

7. A system according to claim 1, wherein application of the dimension filter to the first calculated dimension comprises application of the dimension filter and a second dimension filter to the first calculated dimension.

8. A computer-implemented method comprising:
receiving a query on a first data model, the first data model including a first dimension associated with a second dimension of a second data model;
determining a measure-based filter in a context of the query, the measure-based filter on the second data model;
determining a filter context of the measure-based filter, the filter context comprising a dimension filter on a third data model, the third data model including a third dimension associated with the second dimension of the second data model;
generating a first calculated dimension associated with the third dimension of the third data model;
applying the dimension filter to the first calculated dimension to generate filtered rows of the first calculated dimension;
executing a join between the filtered rows of the first calculated dimension and a fact table of the second data model to generate a first result table including one or more measure values of the second data model;
applying the measure-based filter to the first result table to generate filtered rows of the first result table;
generating a second calculated dimension associated with the filtered rows of the first result table;
applying the measure-based filter to the second calculated dimension to generate filtered rows of the second calculated dimension;
executing an inner join between the filtered rows of the first calculated dimension, the filtered rows of the second calculated dimension, and a fact table of the first data model to generate a second result table;
generating a visualization based on the second result table; and
displaying the visualization.

9. A method according to claim 8, wherein generating the first calculated dimension and applying the dimension filter to the first calculated dimension are performed by a server system in response to a pre-query from a client system.

10. A method according to claim 9, wherein the server system stores the filtered rows of the first calculated dimension as an intermediate table.

11. A method according to claim 10, wherein generating the second calculated dimension and applying the measure-based filter to the second calculated dimension to generate the filtered rows of the second calculated dimension are performed by the server system in response to a second pre-query from the client system.

12. A method according to claim 11, wherein the server system stores the filtered rows of the second calculated dimension as a second intermediate table.

13. A method according to claim 8, wherein generating the visualization comprises executing a query on the second result table.

14. A method according to claim 8, wherein applying the dimension filter to the first calculated dimension comprises applying the dimension filter and a second dimension filter to the first calculated dimension.

15. A computer-readable medium storing non-transitory processor-executable program code, the program code executable to cause a computing system to:
receive a query on a first data model, the first data model including a first dimension associated with a second dimension of a second data model;
determine a measure-based filter in a context of the query, the measure-based filter on the second data model;
determine a filter context of the measure-based filter, the filter context comprising a dimension filter on a third data model, the third data model including a third dimension associated with the second dimension of the second data model;
generate a first calculated dimension associated with the third dimension of the third data model;
apply the dimension filter to the first calculated dimension to generate filtered rows of the first calculated dimension;
execute a join between the filtered rows of the first calculated dimension and a fact table of the second data model to generate a first result table including one or more measure values of the second data model;
apply the measure-based filter to the first result table to generate filtered rows of the first result table;
generate a second calculated dimension associated with the filtered rows of the first result table;
apply the measure-based filter to the second calculated dimension to generate filtered rows of the second calculated dimension;
execute an inner join between the filtered rows of the first calculated dimension, the filtered rows of the second calculated dimension, and a fact table of the first data model to generate a second result table;
generate a visualization based on the second result table; and
display the visualization.

16. A medium according to claim 15, wherein generation of the first calculated dimension and application of the dimension filter to the first calculated dimension are performed by a server system in response to a pre-query from a client system.

17. A medium according to claim 16, wherein the server system stores the filtered rows of the first calculated dimension as an intermediate table.

18. A medium according to claim 17, wherein generation of the second calculated dimension and application of the measure-based filter to the second calculated dimension to generate the filtered rows of the second calculated dimension are performed by the server system in response to a second pre-query from the client system.

19. A medium according to claim 18, wherein the server system stores the filtered rows of the second calculated dimension as a second intermediate table.

* * * * *